US012531345B2

(12) United States Patent
Tang et al.

(10) Patent No.: US 12,531,345 B2
(45) Date of Patent: Jan. 20, 2026

(54) CIRCULARLY POLARIZED ANTENNA AND ARRAY ANTENNA

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Guoqiang Tang, Beijing (CN); Qianyu Guo, Beijing (CN); Feng Qu, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 285 days.

(21) Appl. No.: 18/260,568

(22) PCT Filed: Jul. 27, 2022

(86) PCT No.: PCT/CN2022/108120
§ 371 (c)(1),
(2) Date: Jul. 6, 2023

(87) PCT Pub. No.: WO2024/020823
PCT Pub. Date: Feb. 1, 2024

(65) Prior Publication Data

US 2024/0387997 A1 Nov. 21, 2024

(51) Int. Cl.

| | |
|---|---|
| ***H01Q 9/04*** | (2006.01) |
| ***H01Q 1/48*** | (2006.01) |
| ***H01Q 23/00*** | (2006.01) |

(52) U.S. Cl.
CPC ............. *H01Q 9/0428* (2013.01); *H01Q 1/48* (2013.01); *H01Q 9/045* (2013.01); *H01Q 23/00* (2013.01)

(58) Field of Classification Search
CPC ........ H01Q 1/48; H01Q 21/065; H01Q 5/385; H01Q 9/0428; H01Q 19/005
See application file for complete search history.

(56) References Cited

U.S. PATENT DOCUMENTS 10,998,633 B2 * 5/2021 Nasimuddin .......... H01Q 9/045
12,206,187 B2 * 1/2025 Ying ....................... G01S 3/043
(Continued)

FOREIGN PATENT DOCUMENTS

CN 103490151 A * 1/2014
CN 108232432 A 6/2018
(Continued)

*Primary Examiner* — Monica C King
(74) *Attorney, Agent, or Firm* — DINSMORE & SHOHL LLP

(57) ABSTRACT

The present disclosure provides a circular polarized antenna and an array antenna, belonging to the technical field of antenna. The circularly polarized antenna includes: a first substrate; a ground plate disposed on a first side of the first substrate; a main patch and a plurality of parasitic patches disposed on a second side of the first substrate opposite to the first side, wherein the plurality of the parasitic patches are disposed around the main patch and are in rotationally symmetrical distribution by taking the main patch as a center; and a feeding line disposed in the first substrate for electrically connecting the ground plate and the main patch.

19 Claims, 11 Drawing Sheets

(56) References Cited

U.S. PATENT DOCUMENTS

| | | | | |
|---|---|---|---|---|
| 2008/0204326 | A1* | 8/2008 | Zeinolabedin Rafi | H01Q 9/0428 343/700 MS |
| 2017/0047657 | A1 | 2/2017 | Lee et al. | |
| 2018/0294567 | A1 | 10/2018 | O'Brien et al. | |

FOREIGN PATENT DOCUMENTS

| | | | |
|---|---|---|---|
| CN | 110112554 | A | 8/2019 |
| JP | 2006025035 | A | 1/2006 |
| JP | 2017092588 | A | 5/2017 |

* cited by examiner

CIRCULARLY POLARIZED ANTENNA AND ARRAY ANTENNA

CROSS-REFERENCE TO RELATED APPLICATIONS

The present application is a U.S. National Stage Application under 35 U.S.C. § 371 of International Patent Application No. PCT/CN2022/108120, filed on Jul. 27, 2022, the disclosure of which is incorporated by reference herein in its entirety.

TECHNICAL FIELD

The present disclosure relates to the field of antenna technology, and in particular, to a circularly polarized antenna and an array antenna.

BACKGROUND

Currently, a circularly polarized antenna is widely used in the field of satellite communications and the like. With the development of communication services, the amount of data to be transmitted by a satellite is increasing, which requires an antenna with a wider bandwidth.

In the related art, there are mainly two methods for increasing an axial ratio bandwidth of the circularly polarized antenna: the first method is to increase a height of the antenna profile, and the second method is to increase an electrical size of the antenna.

SUMMARY

According to a first aspect of the embodiments of the present disclosure, there is provided a circularly polarized antenna, comprising: a first substrate; a ground plate disposed on a first side of the first substrate; a main patch and a plurality of parasitic patches disposed on a second side of the first substrate opposite to the first side, wherein the plurality of the parasitic patches are disposed around the main patch and are in rotationally symmetrical distribution by taking the main patch as a center; and a feeding line disposed in the first substrate for electrically connecting the ground plate and the main patch.

In some embodiments, each parasitic patch of the plurality of the parasitic patches is in a shape of an annular sector by taking a center of the main patch as a circle center.

In some embodiments, an axial ratio bandwidth of the circularly polarized antenna is in positive correlation with a radius length of a circular arc of the each parasitic patch away from the main patch.

In some embodiments, the axial ratio bandwidth of the circularly polarized antenna is in positive correlation with a central angle of the each parasitic patch.

In some embodiments, the axial ratio bandwidth of the circularly polarized antenna is in positive correlation with a distance between the main patch and the each parasitic patch, wherein the distance is a difference between a radius length of a circular arc of the each parasitic patch close to the main patch and a radius length of the main patch.

In some embodiments, an operating frequency of the circularly polarized antenna is associated with at least one of a radius length of the main patch, a radius length of a circular arc of the each parasitic patch close to the main patch, or a radius length of a circular arc of the each parasitic patch away from the main patch.

In some embodiments, a number of the plurality of the parasitic patches is 2.

In some embodiments, each parasitic patch of the plurality of the parasitic patches is in a shape of a rectangular.

In some embodiments, the circularly polarized antenna further comprising: a rotatable second substrate disposed on a side of the main patch away from the first substrate, wherein the plurality of the parasitic patches are disposed on a side of the second substrate close to the first substrate, and a rotational axis of the second substrate passes through a center of the main patch and is perpendicular to the plane where the main patch is located.

In some embodiments, a surface of the main patch close to the first substrate and a surface of each parasitic patch of the plurality of the parasitic patches close to the first substrate are in a same plane.

In some embodiments, a surface of the main patch close to the first substrate and a surface of each parasitic patch of the plurality of the parasitic patches close to the first substrate are in different planes.

In some embodiments, the surface of the each parasitic patch of the plurality of the parasitic patches close to the first substrate is in a same plane.

In some embodiments, a surface of at least one parasitic patch of the plurality of the parasitic patches close to the first substrate and surfaces of the other parasitic patches of the plurality of the parasitic patches are in different planes.

In some embodiments, a plurality of notches are disposed at an edge of the main patch, and the plurality of the notches are symmetrically distributed by taking the main patch as a center.

In some embodiments, each notch of the plurality of the notches is in a shape of a polygon or a circular arc.

In some embodiments, the polygon comprises a square or rectangle.

In some embodiments, the main patch is in a shape of a polygon, a circle, an ellipse, or an annular.

In some embodiments, the polygon in a shape of a square, a rectangle, a triangle, or a pentagon.

According to a first aspect of embodiments of the present disclosure, there is provided an array antenna, comprising: a plurality of circularly polarized antennas as described in any of the above embodiments, a plurality of phase shifters, wherein the plurality of the phase shifters are in one-to-one correspondence with the plurality of the circularly polarized antennas, and each phase shifter of the plurality of the phase shifters is used for performing phase shift processing on a signal transmitted by a corresponding circularly polarized antenna or a signal received by the corresponding circularly polarized antenna; and a power divider configured to distribute power for each circularly polarized antenna of the circularly polarized antennas.

In some embodiments, the plurality of circularly polarized antennas are configured as a linear array antenna or a planar array antenna.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings, which constitute a part of this specification, illustrate embodiments of the disclosure and, together with the description, serve to explain the principles of the disclosure.

The present disclosure may be understood more clearly from the following detailed description taken in conjunction with the accompanying drawings, in which.

It should be understood that the dimensions of the various parts shown in the drawings are not drawn to scale. Further, the same or similar reference numerals denote the same or similar components.

DETAILED DESCRIPTION

Various exemplary embodiments of the present disclosure will now be described in detail with reference to the accompanying drawings. The description of the exemplary embodiments is merely illustrative and is in no way intended to limit the disclosure, its application, or uses. The present disclosure may be embodied in many different forms and is not limited to the embodiments described herein. These embodiments are provided so that this disclosure will be thorough and complete, and will fully convey the scope of the disclosure to those skilled in the art. It should be noted that the relative arrangement of parts and steps, the composition of materials and values set forth in these embodiments are to be construed as illustrative only and not as limiting unless otherwise specifically stated.

The use of "first", "second", and similar words in this disclosure is not intended to indicate any order, quantity, or importance, but rather is used to distinguish one element from another. The word "comprise", "include" or the like means that the element preceding the word comprises the element listed after the word, and does not exclude the possibility that other elements may also be included.

All terms (including technical or scientific terms) used herein have the same meaning as commonly understood by one of ordinary skill in the art to which this disclosure belongs unless specifically defined otherwise. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Techniques, methods, and apparatus known to one of ordinary skill in the relevant art may not be discussed in detail but are intended to be part of the specification where appropriate.

The inventors found that the method for increasing the axial ratio bandwidth of the circularly polarized antenna in the related art can increase the axial ratio bandwidth of the circularly polarized antenna, however the method leads to an increase in the thickness of the antenna profile and an increase in the antenna size, which is contradictory to the requirements of miniaturization, compactness and low profile in the satellite communication field.

Accordingly, the present disclosure provides a circularly polarized antenna, which can increase the axial ratio bandwidth of the circularly polarized antenna without increasing the height of the antenna profile.

Figure 1:
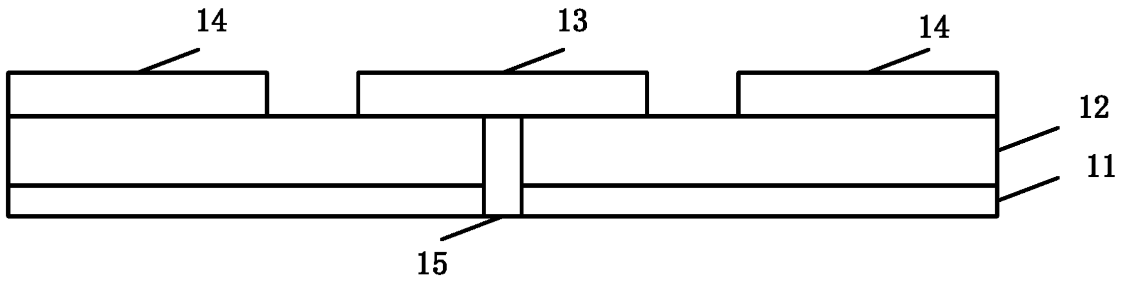
FIG. 1 is a schematic cross-sectional view of a circularly polarized antenna according to one embodiment of the present disclosure.

FIG. 1 is a cross-sectional view of a circularly polarized antenna according to one embodiment of the present disclosure. As shown in FIG. 1, the circularly polarized antenna includes a ground plane 11, a first substrate 12, a main patch 13, a plurality of parasitic patches 14, and a feeding line 15.

The ground plate 11 is disposed on a first side of the first substrate 12. The main patch 13 and the plurality of the parasitic patches 14 are disposed on a second side of the first substrate 12 opposite to the first side. The plurality of the parasitic patches 14 are disposed around the main patch 13 and are in rotationally symmetrical distribution by taking the main patch 13 as a center. The feeding line 15 is disposed in the line 15 is used for first substrate 12, and the feeding electrically connecting the ground plate 11 and the main patch 13.

In the circularly polarized antenna provided by the above embodiment of the present disclosure, the axial ratio bandwidth of the circularly polarized antenna can be effectively increased without increasing the height of the antenna profile by adjusting the sizes and relative positions of the main patch and the parasitic patches.

In some embodiments, a surface of the main patch 13 close to the first substrate 12 and a surface of each parasitic patches of the plurality of the parasitic patches 14 close to the first substrate 12 are in the same plane.

For example, two parasitic patches are shown in FIG. 1. The surface of the main patch 13 close to the first substrate 12 and the surface of the each parasitic patch 14 close to the first substrate 12 are in the same plane.

In other embodiments, the surface of the main patch 13 close to the first substrate 12 and the surface of the each parasitic patch of the plurality of parasitic patches 14 close to the first substrate 12 are in different planes.

Figure 2:
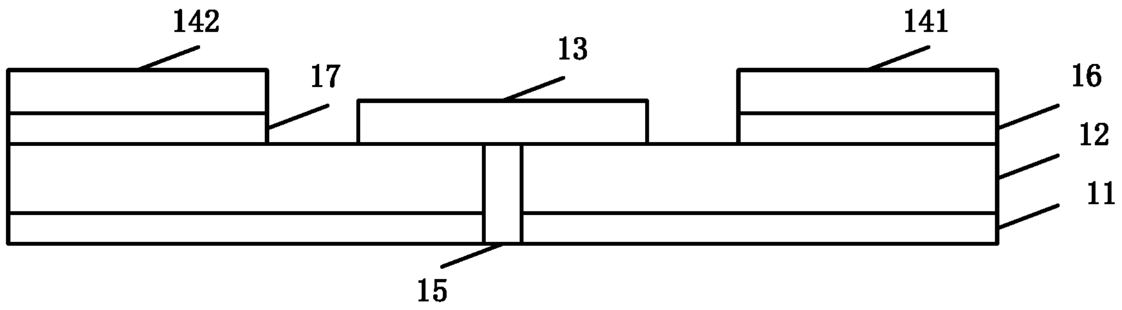
FIG. 2 is a schematic cross-sectional view of a circularly polarized antenna according to another embodiment of the present disclosure.

FIG. 2 is a schematic cross-sectional view of a circularly polarized antenna according to another embodiment of the present disclosure.

FIG. 2 shows two parasitic patches 141 and 142. A substrate 16 is disposed between the parasitic patch 141 and the first substrate 12, and a substrate 17 is disposed between the parasitic patch 142 and the first substrate 12.

It shall be noted that the materials of the substrates 16 and 17 is the same as or different from the material of the first substrate 12.

In some embodiments, the thickness of substrates 16 and 17 is no greater than the thickness of first substrate 12.

That is, the surface of the main patch close to the first substrate and the surface of the each parasitic patch of the plurality of the parasitic patches close to the first substrate is located in the same plane, or in different planes, such that the circularly polarized antenna can be designed with more flexibility.

In some embodiments, the surface of the each parasitic patch of the plurality of the parasitic patches close to the first substrate is in the same plane.

For example, as shown in FIG. 2, the substrates 16 and 17 have the same thickness, such that the surface of the parasitic patch 141 close to the first substrate 12 and the surface of the parasitic patch 142 close to the first substrate 12 are in the same plane.

In other embodiments, a surface of at least one parasitic patch of the plurality of the parasitic patches close to the first substrate and surfaces of the other parasitic patches of the plurality of the parasitic patches are in different planes.

Figure 3:
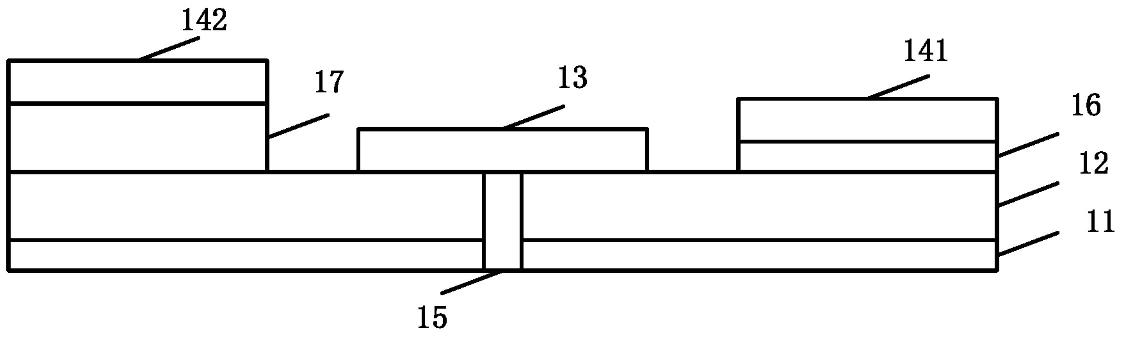
FIG. 3 is a schematic cross-sectional view of a circularly polarized antenna according to still another embodiment of the present disclosure.

FIG. 3 is a schematic cross-sectional view of a circularly polarized antenna according to still another embodiment of the present disclosure.

As shown in FIG. 3, two parasitic patches 141 and 142 are shown. the substrate 16 is disposed between the parasitic patch 141 and the first substrate 12, and a substrate 17 is disposed between the parasitic patch 142 and the first substrate 12. The thickness of the substrate 16 is different from the thickness of the substrate 17, such that the surface of the parasitic patch 141 close to the first substrate 12 and the surface of the parasitic patch 142 close to the first substrate 12 are in different planes.

That is, in the plurality of the parasitic patches, the surface of each parasitic patch close to the first substrate may be in the same plane, or may be in different planes, thereby improving the flexibility of design of the circularly polarized antenna.

Figure 4:
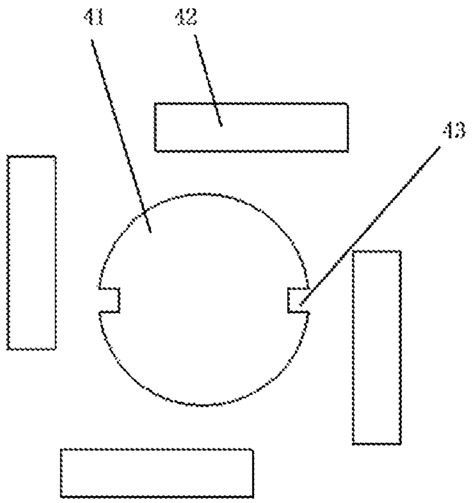
FIG. 4 is a top view of a circularly polarized antenna according to one embodiment of the present disclosure.

FIG. 4 is a top view of a circularly polarized antenna according to one embodiment of the present disclosure.

As shown in FIG. 4, the circularly polarized antenna includes a main patch 41 and the plurality of the parasitic patches 42. The plurality of the parasitic patches 42 are disposed around the main patch 41, and are in rotational symmetrical distribution by taking the main patch 41 as a center.

In some embodiments, the surface of the main patch 41 close to the first substrate and the surface of each parasitic patch of the plurality of the parasitic patches 42 close to the first substrate are in the same plane.

In some embodiments, the surface of the main patch 41 close to the first substrate is in a first plane, and the surface of each parasitic patch of the plurality of the parasitic patches 42 close to the first substrate is not in the first plane.

For example, the surface of the each parasitic patche of the plurality of the parasitic patches 42 close to the first substrate is in a second plane different from the first plane.

For another example, the surface of the one parasitic patch of the plurality of the parasitic patches 42 close to the first substrate is in the second plane different from the first plane, and the surfaces of the other three parasitic patches of the plurality of the parasitic patches 42 close to the first substrate are in a third plane different from the first and second planes.

For another example, the surface of the each parasitic patch of the plurality of the parasitic patches 42 close to the first substrate is not in a first plane, and the surface of the each parasitic patch of the plurality of the parasitic patches 42 close to the first substrate is in a different plane.

In some embodiments, the main patch is in a shape of a polygon, a circle, an ellipse, or an annular. For example, the polygon includes a square, a rectangle, a triangle, a pentagon, or other suitable shapes.

In some embodiments, a plurality of notches 43 are disposed at the edge of the main patch 41, and the plurality of the notches 43 are symmetrically distributed by taking the main patch 41 as a center.

For example, as shown in FIG. 4, the edge of the main patch 41 is disposed with two notches 43.

In some embodiments, each notch 43 is in a shape of a polygon or a circular arc. For example, the polygonal includes a square, a rectangle, or other suitable shapes.

In some embodiments, as shown in FIG. 4, each parasitic patch of the plurality of the parasitic patches 42 is in a shape of a rectangular. For example, the circularly polarized antenna may include four or two parasitic patches which are rectangular in shape.

For example, as shown in FIG. 4, the circularly polarized antenna includes four parasitic patches 42 which are rectangular in shape.

In some embodiments, the operating frequency band of the circularly polarized antenna shown in FIG. 4 belongs to the S-band. The frequency band of the S-band is 2-4 GHz, and the range of the wavelength $\lambda$ is 75-150 mm. For example, the circularly polarized antenna has an operating frequency of 3 GHz and a wavelength $\lambda$ of 100 mm.

In a case where the operating frequency band of the circularly polarized antenna belongs to the S-band, the radius of the main patch 41 is $0.12\lambda$-$0.14\lambda$, the length of the notch 43 is $0.02\lambda$-$0.04\lambda$, the width of the notch 43 is $0.02\lambda$-$0.03\lambda$, the length of the parasitic patch 42 is $0.2\lambda$-$0.3\lambda$, and the width of the parasitic patch 42 is $0.01\lambda$-$0.1\lambda$.

For example, the radius of main patch 41 is $0.135\lambda$, the length of notch 43 is $0.03\lambda$, the width of notch 43 is $0.026\lambda$, the length of parasitic patch 42 is $0.245\lambda$, and the width of parasitic patch 42 is $0.06\lambda$.

Figure 5:
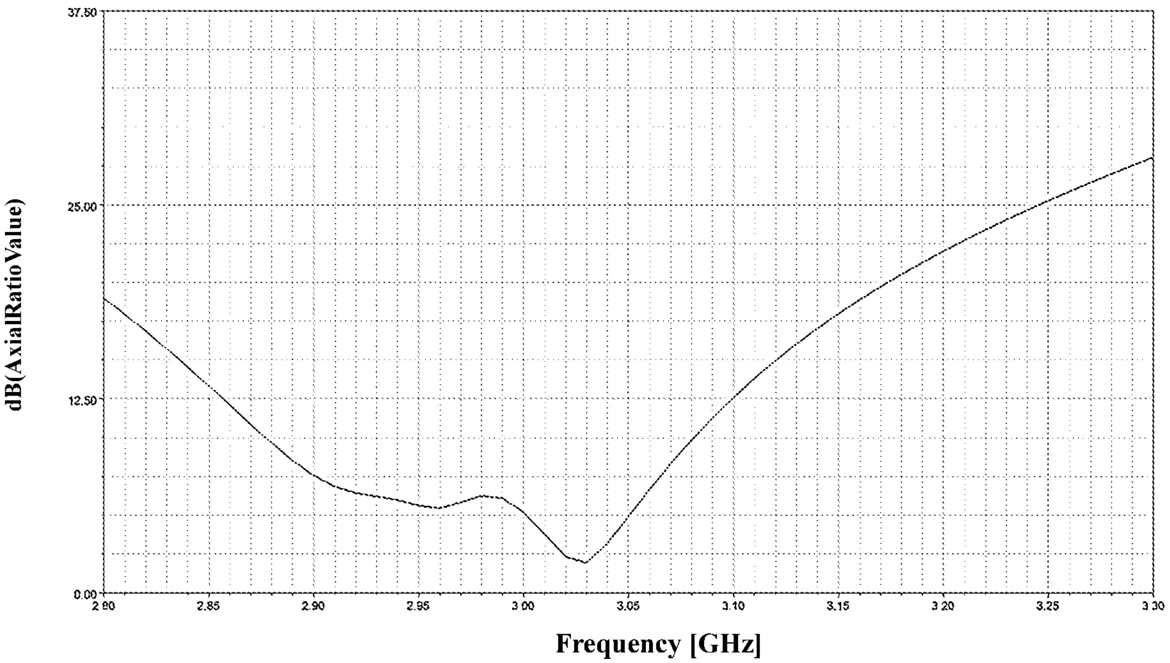
FIG. 5 is a schematic diagram illustrating the axial ratio simulation results for the embodiment shown in FIG. 4.

In some embodiments, in a case where the radius of the main patch 41 is 13.5 mm, the length of the each parasitic patch 42 is 24.5 mm, the width of the each parasitic patch 42 is 6 mm, the length of the notch 43 is 3 mm, and the width of the notch 43 is 2.6 mm, the simulation result is shown in FIG. 5.

According to the simulation result shown in FIG. 5, it can be known that the 3 dB axial ratio bandwidth of the circularly polarized antenna is 0.66% (3.02-3.04 GHz), which can meet the requirements of satellite communication.

Figure 6:
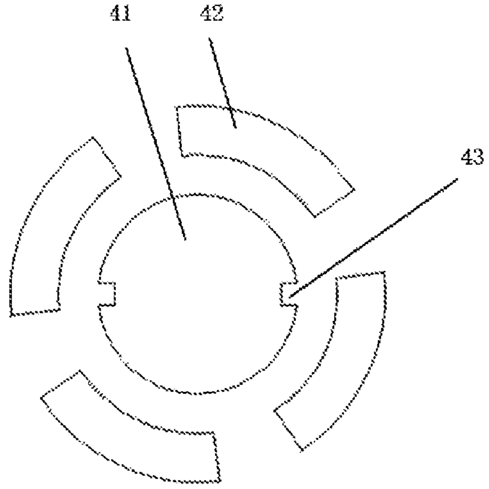
FIG. 6 is a top view of a circularly polarized antenna according to another embodiment of the present disclosure.

FIG. 6 is a top view of a circularly polarized antenna according to another embodiment of the present disclosure.

FIG. 6 differs from FIG. 4 in that in the embodiment of FIG. 4, each parasitic patch of the plurality of the parasitic patches 42 is in a shape of a rectangular. In the embodiment shown in FIG. 6, each parasitic patch of the plurality of the parasitic patches 42 is in a shape of an annular sector by taking the center of the main patch 41 as a circular center.

In some embodiments, the operating frequency band of the circularly polarized antenna shown in FIG. 6 belongs to the S-band. The frequency band of the S-band is 2-4 GHz, and the range of wavelength λ is 75-150 mm. For example, the circularly polarized antenna has an operating frequency of 3 GHz and a wavelength λ of 100 mm.

In a case where the operating frequency band of the circularly polarized antenna belongs to the S-band, the radius of the main patch 41 is 0.12λ-0.14λ, the length of the notch 43 is 0.02λ-0.04λ, the width of the notch 43 is 0.02λ-0.03λ, the inner arc radius of the parasitic patch 42 (the radius length of the circular arc of the parasitic patch close to the main patch) is 0.1λ-0.2λ, the outer arc radius of the parasitic patch 42 (the radius length of the circular arc of the parasitic patch away from the main patch) is 0.2λ-0.3λ, and the difference between the inner arc radius of the parasitic patch 42 and the radius of the main patch 41 is 0.02λ-0.06λ.

For example, the radius of the main patch 41 is 0.135λ, the length of the notch 43 is 0.03λ, the width of the notch 43 is 0.021λ, the inner arc radius of the parasitic patch 42 is 0.17λ, the outer arc radius of the parasitic patch 42 is 0.24λ, and the difference between the inner arc radius of the parasitic patch 42 and the radius of the main patch 41 is 0.035λ.

In some embodiments, as shown in FIG. 6, the circularly polarized antenna includes 4 parasitic patches 42 each having a shape of an annular sector. In a case where the inner arc radius of the each parasitic patch 42 is 17 mm, and the outer arc radius of the each parasitic patch 42 is 24 mm, the central angle is 61°. The radius of the main patch 41 is 13.5 mm, and the notch 43 is a shape of a rectangle having a length of 3 mm and a width of 2.1 mm, and the difference between the inner arc radius of the parasitic patch 42 and the radius of the main patch 41 is 3.5 mm, the simulation result is shown in FIG. 7.

Figure 7:
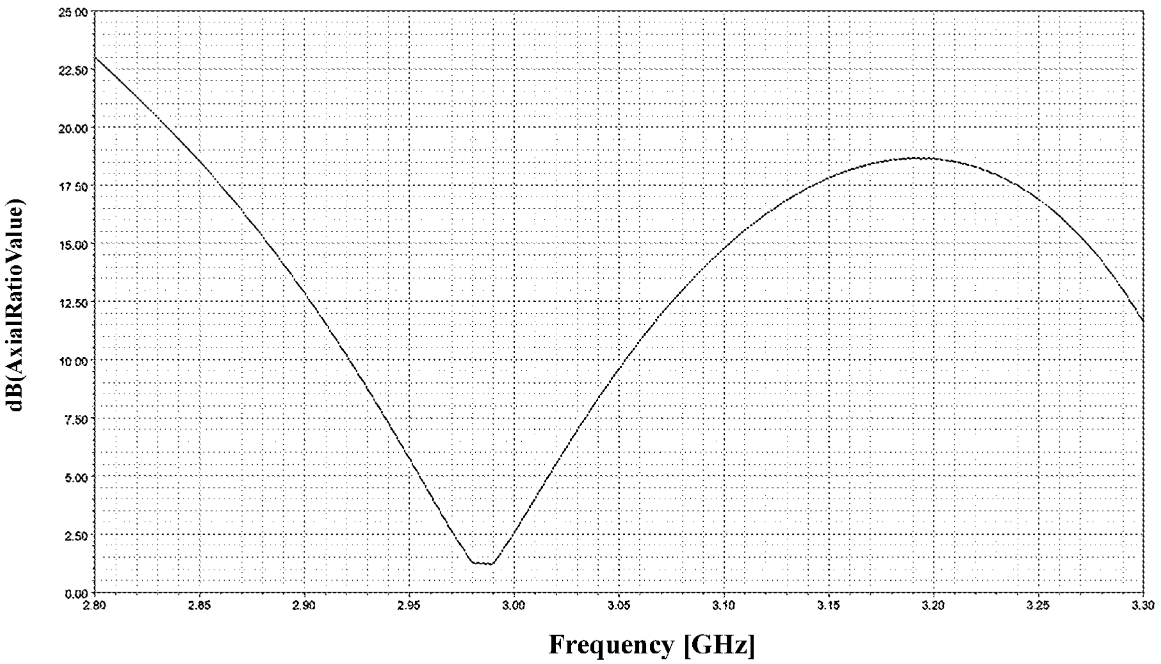
FIG. 7 is a schematic diagram showing the axial ratio simulation results for the embodiment shown in FIG. 6.

According to the simulation results shown in FIG. 7, it can be seen that the 3 dB axial ratio bandwidth of the circularly polarized antenna is 1% (2.98-3.01 GHz). It can be seen that the circularly polarized antenna shown in FIG. 6 has an advantage of further improving the axial ratio bandwidth when compared with the embodiment shown in FIG. 4.

Figure 8:
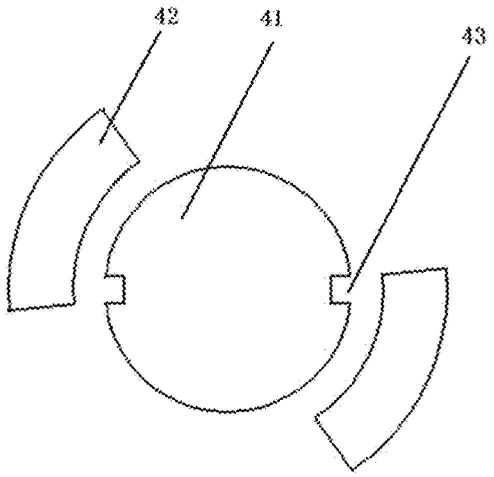
FIG. 8 is a top view of a circularly polarized antenna according to still another embodiment of the present disclosure.

FIG. 8 is a top view of a circularly polarized antenna according to still another embodiment of the present disclosure.

FIG. 8 differs from FIG. 6 in that, in the embodiment shown in FIG. 6, the circularly polarized antenna includes four annular sectors 42 by taking the center of the main patch 41 as a circle center. In the embodiment shown in FIG. 8, the circularly polarized antenna includes two annular sectors 42 by taking the center of the main patch 41 as a circle center.

In some embodiments, as shown in FIG. 8, the operating frequency band of the circularly polarized antenna belongs to the S-band. The frequency band of the S-band is 2-4 GHz, and the range of the wavelength λ is 75-150 mm. For example, the operating frequency of the circularly polarized antenna is 3 GHz, and the wavelength λ is 100 mm.

Figure 9:
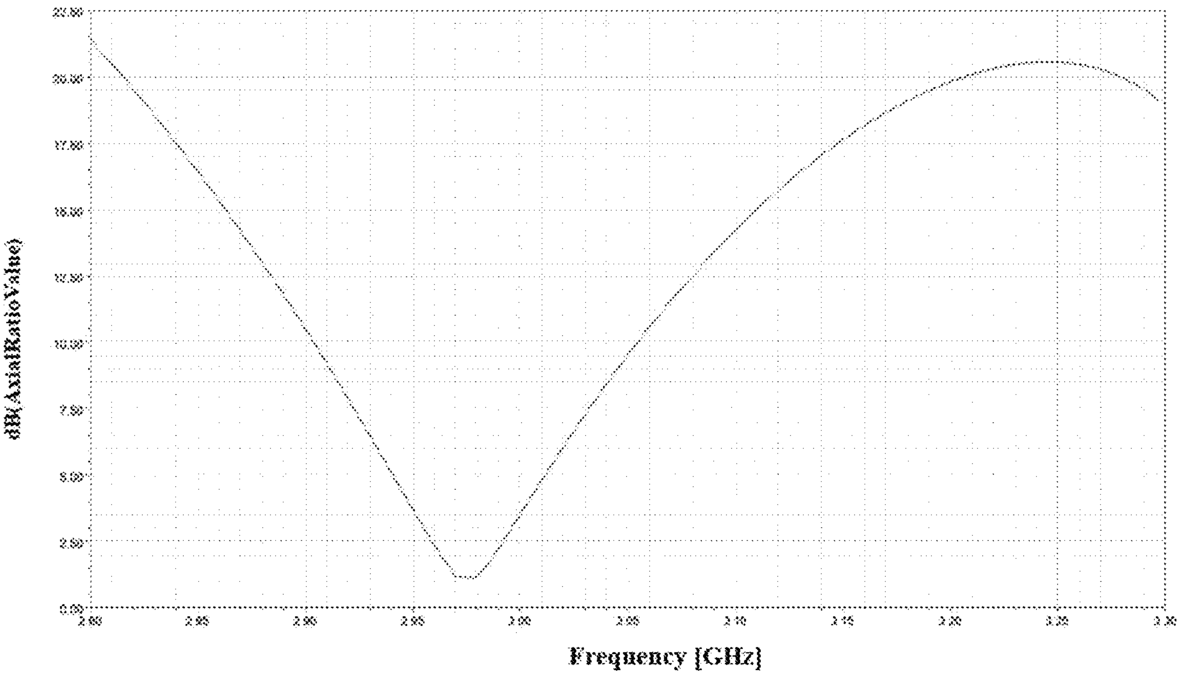
FIG. 9 is a schematic diagram showing the axial ratio simulation results for the embodiment shown in FIG. 8.

For example, as shown in FIG. 8, in a case where the each parasitic patch 42 has an inner arc radius of 17 mm and an outer arc radius of 24 mm, the central angle is 61°, the radius of the main patch 41 is 13.5 mm, and the notch 43 is a rectangle having a length of 3 mm and a width of 2.1 mm, and the difference between the inner arc radius of the parasitic patch 42 and the radius of the main patch 41 is 3.5 mm, the simulation result is shown in FIG. 9.

According to the simulation result shown in FIG. 9, it can be seen that the 3 dB axial ratio bandwidth of the circularly polarized antenna is 1.01% (2.97-3 GHz). It can be seen that the axial ratio bandwidth of the circularly polarized antenna shown in FIG. 8 is similar to the axial ratio bandwidth of the circularly polarized antenna shown in FIG. 6. However, the circularly polarized antenna in FIG. 8 only includes two parasitic patches, such that the size of the circularly polarized antenna in FIG. 8 is apparently smaller than that of the circularly polarized antenna in FIG. 6. It can be seen that the circularly polarized antenna in FIG. 8 has the advantages of miniaturization and integration as well as reduction of the manufacturing cost of the circular polarization antenna when compared with the embodiment shown in FIG. 6.

In some embodiments, the axial ratio bandwidth of the circularly polarized antenna is in positive correlation with the radial length of the circular arc of the each parasitic patch away from the main patch.

Figure 10:
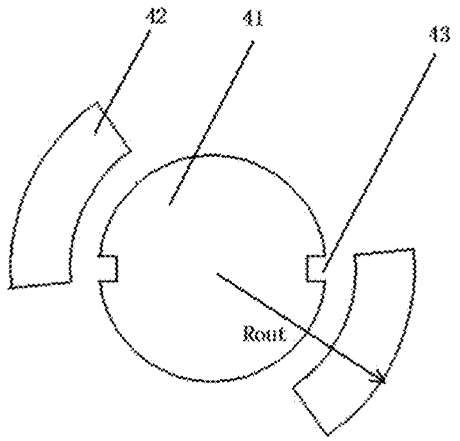
FIG. 10 is a top view of a circularly polarized antenna according to still another embodiment of the present disclosure.

For example, as shown in FIG. 10, the radius length of the circular arc of the parasitic patch 42 away from the main patch (i.e., the outer arc radius) is Rout. As the radius length Rout increases, the axial ratio bandwidth of the circularly polarized antenna is further optimized.

In some embodiments, as shown in FIG. 10, the operating frequency band of the circularly polarized antenna belongs to the S-band. The frequency band of the S-band is 2-4 GHz, and the range of the wavelength λ is 75-150 mm. For example, the operating frequency of the circularly polarized antenna is 3 GHz, and its wavelength λ is 100 mm.

FIG. 10 differs from FIG. 8 only in the outer arc radius of the parasitic patch 42. For example, in the embodiment shown in FIG. 8, the parasitic patch 42 has an outer arc radius of 0.24λ. In the embodiment shown in FIG. 10, the parasitic patch 42 has an outer arc radius of 0.255λ.

Figure 11:
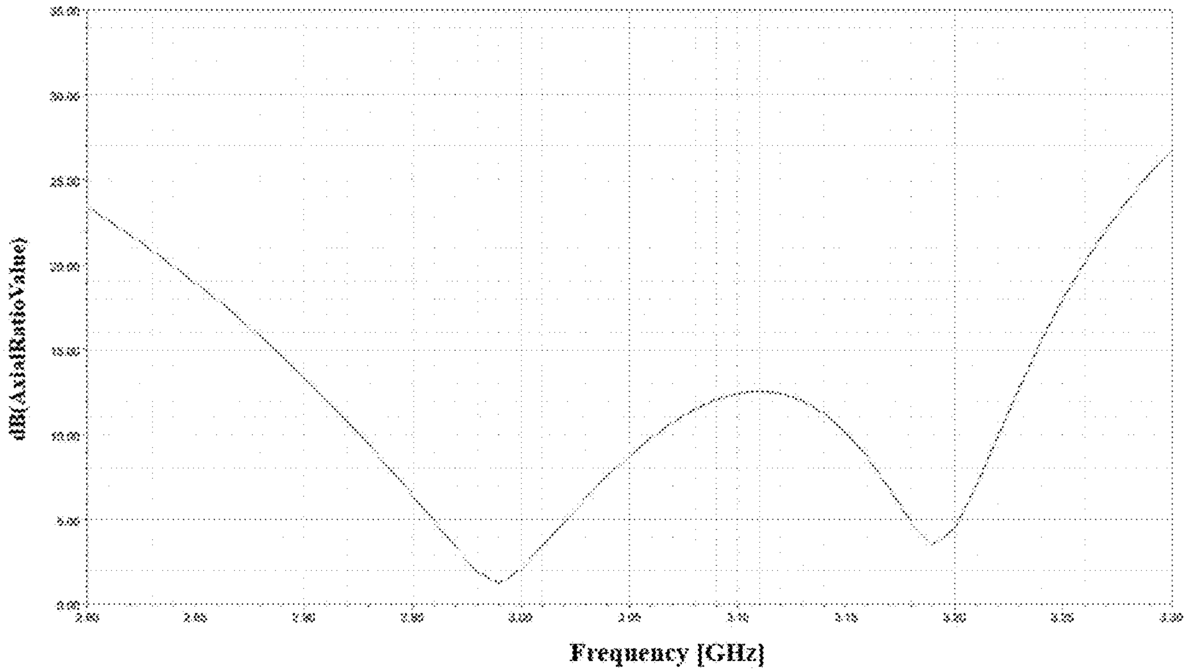
FIG. 11 is a schematic diagram showing the axial ratio simulation results for the embodiment shown in FIG. 10.

For example, as shown in FIG. 10, in a case where the each parasitic patch 42 has an inner arc radius of 17 mm and an outer arc radius of 25.5 mm, it has a central angle of 61°, the radius of the main patch 41 is 13.5 mm, and the notch 43 is a rectangle having a length of 3 mm and a width of 2.1 mm, and the difference between the inner arc radius of the parasitic patch 42 and the radius of the main patch 41 is 3.5 mm, the simulation result is shown in FIG. 11.

According to the simulation result shown in FIG. 11, it can be seen that the 3 dB axial ratio bandwidth of the circularly polarized antenna is 1.34% (2.97-3.01 GHz). It can be seen that the circularly polarized antenna shown in FIG. 10 has an advantage of further improving the axial ratio bandwidth when compared with the embodiment shown in FIG. 8.

In some embodiments, the axial ratio bandwidth of the circularly polarized antenna is in positive correlation with the central angle of each parasitic patch.

Figure 12:
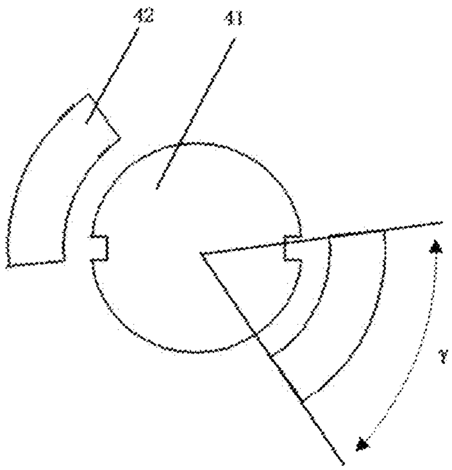
FIG. 12 is a top view of a circularly polarized antenna according to still another embodiment of the present disclosure.

For example, as shown in FIG. 12, the each parasitic patch 42 has a central angle of γ. As the central angle γ increases, the axial ratio bandwidth of the circularly polarized antenna is further optimized.

In some embodiments, as shown in FIG. 12, the operating frequency band of the circularly polarized antenna belongs to the S-band. The frequency band of the S-band is 2-4 GHz, and the range of the wavelength λ is 75-150 mm. For example, the circularly polarized antenna has an operating frequency of 3 GHz and a wavelength λ of 100 mm.

FIG. 12 differs from FIG. 10 only in the difference of the central angle of the parasitic patch 42. For example, in the embodiment shown in FIG. 10, the central angle of the parasitic patch 42 is 61°. In the embodiment shown in FIG. 12, the central angle of the parasitic patch 42 is 63°.

Figure 13:
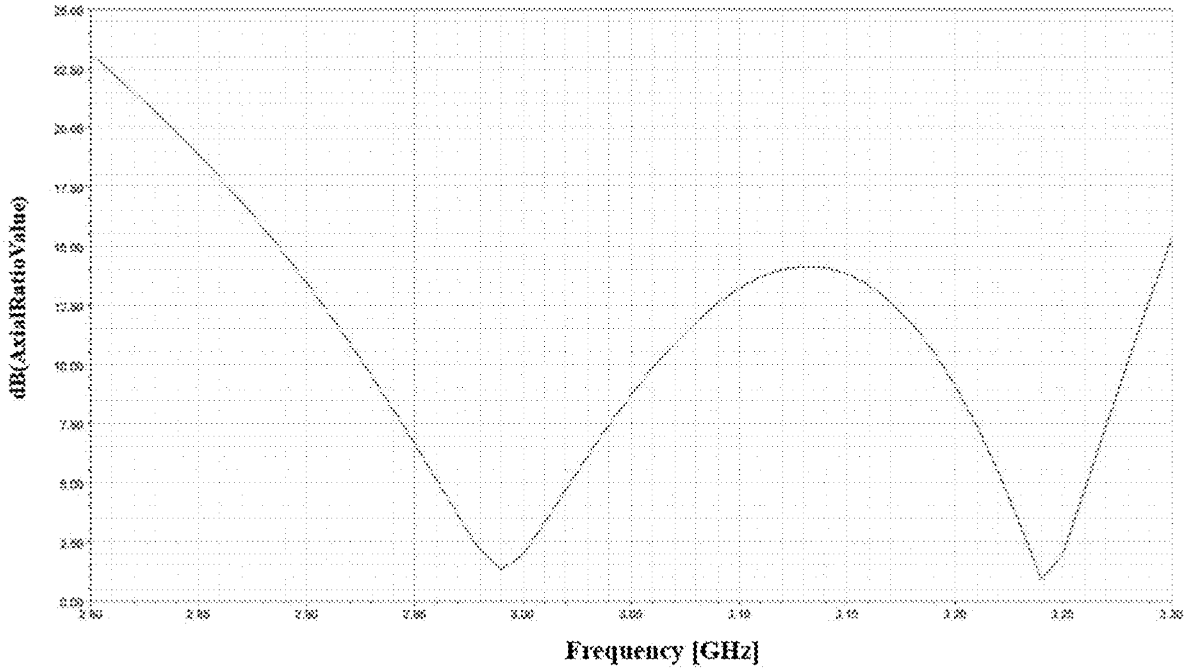
FIG. 13 is a schematic diagram showing the axial ratio simulation results for the embodiment shown in FIG. 12.

For example, as shown in FIG. 12, in a case where the each parasitic patch 42 has an inner arc radius of 17 mm and an outer arc radius of 25.5 mm, the central angle is 63°, the radius of the main patch 41 is 13.5 mm, and the notch 43 is a rectangle having a length of 3 mm and a width of 2.1 mm, and the difference between the inner arc radius of the parasitic patch 42 and the radius of the main patch 41 is 3.5 mm, the simulation result is shown in FIG. 13.

According to the simulation result shown in FIG. 13, it can be seen that the 3 dB axial ratio bandwidth of the circularly polarized antenna is 1.67% (2.97-3.02 GHz). It can be seen that the circularly polarized antenna shown in FIG. 12 has an advantage of further improving the axial ratio bandwidth when compared with the embodiment shown in FIG. 10.

In some embodiments, the axial ratio bandwidth of the circularly polarized antenna is in positive correlation with the distance between the main patch and each parasitic patch, wherein the distance is a difference between the radius length of a circular arc of the each parasitic patch close to the main patch and the radius length of the main patch.

Figure 14:
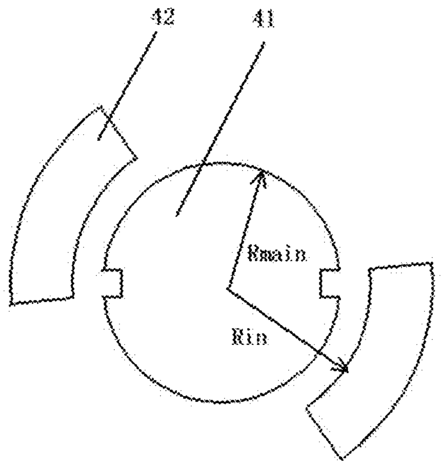
FIG. 14 is a top view of a circularly polarized antenna according to still another embodiment of the present disclosure.

For example, as shown in FIG. 14, the distance between the main patch 41 and the parasitic patch 42 is the difference between the inner arc radius $R_{in}$ of the parasitic patch 42 and the radius $R_{main}$ of the main patch 41. As this distance increases, the axial ratio bandwidth of the circularly polarized antenna is further optimized.

In some embodiments, as shown in FIG. 14, the operating frequency band of the circularly polarized antenna belongs to the S-band. The frequency band of the S-band is 2-4 GHz, and the range of the wavelength λ is 75-150 mm. For example, the operating frequency of the circularly polarized antenna is 3 GHz and its wavelength λ is 100 mm.

FIG. 14 differs from FIG. 12 only in the distance between the main patch 41 and the parasitic patches 42. In the embodiment shown in FIG. 12, the difference between the inner arc radius of the parasitic patch 42 and the radius of the main patch 41 is 0.035λ. In the embodiment shown in FIG. 14, the difference between the inner arc radius of the parasitic patch 42 and the radius of the main patch 41 is 0.055λ.

Figure 15:
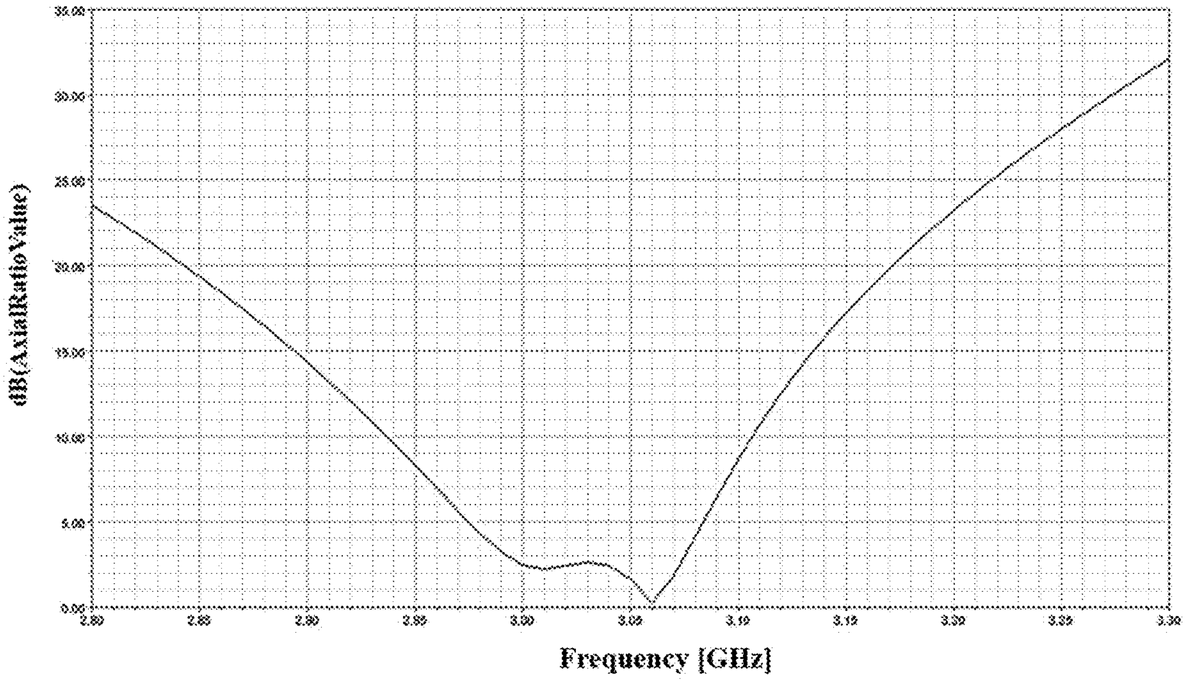
FIG. 15 is a schematic diagram showing the axial ratio simulation results for the embodiment shown in FIG. 14.

For example, in the embodiment shown in FIG. 14, in a case where the each parasitic patch 42 has an inner arc radius of 19 mm and an outer arc radius of 25.5 mm, it has a central angle of 63°, the radius of the main patch 41 is 13.5 mm, and the notch 43 is a rectangle having a length of 3 mm and a width of 2.1 mm, and the difference between the inner arc radius of the parasitic patch 42 and the radius of the main patch 41 is 5.5 mm, the simulation result is shown in FIG. 15.

From the simulation results shown in FIG. 15, it can be seen that the 3 dB axial ratio bandwidth of the circularly polarized antenna is 2.64% (2.99-3.07 GHz). It can be seen that the circularly polarized antenna shown in FIG. 14 has an advantage of further improving the axial ratio bandwidth when compared with the embodiment shown in FIG. 12.

In some embodiments, the operating frequency of the circularly polarized antenna is associated with at least one of a radius length of the main patch, a radius length of a circular arc of the each parasitic patch close to the main patch, or a radius length of a circular arc of the each parasitic patch away from the main patch.

In other words, the sizes and relative position of the main patch and the parasitic patch can be adjusted to meet the requirement of the satellite in a specific frequency band.

Figure 16:
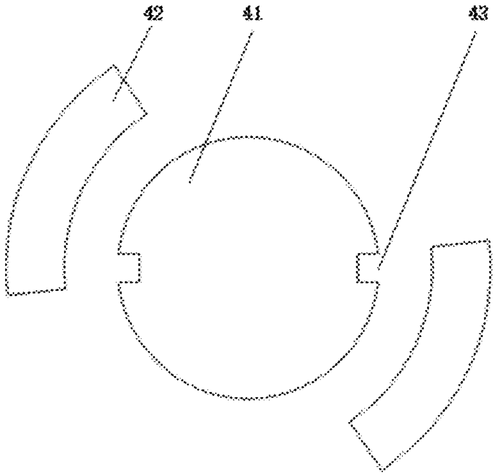
FIG. 16 is a top view of a circularly polarized antenna according to still another embodiment of the present disclosure.

FIG. 16 is a top view of a circularly polarized antenna according to another embodiment of the present disclosure.

FIG. 16 differs from FIG. 8 in that in the embodiment shown in FIG. 8, the operating frequency band of the circularly polarized antenna belongs to the S-band. The frequency band of the S-band is 2-4 GHz, and the range of the wavelength A is 75-150 mm. For example, the circularly polarized antenna has an operating frequency of 3 GHz and a wavelength λ of 100 mm. In the embodiment shown in FIG. 16, the operating frequency band of the circularly polarized antenna belongs to the L-band. The frequency band of the L-band is 1-2 GHz, and the range of the wavelength λ is 150-300 mm. For example, the circularly polarized antenna has an operating frequency of 1.5 GHz and a wavelength A of 200 mm.

In a case where the operating frequency band of the circularly polarized antenna belongs to the L-band, the radius of the main patch 41 is 0.12λ-0.14λ, the length of the notch 43 is 0.02λ-0.04λ, the width of the notch 43 is 0.02λ-0.03λ, the inner arc radius of the parasitic patch 42 is 0.15λ-0.25λ, the outer arc radius of the parasitic patch 42 is 0.2λ-0.3λ, and the difference between the inner arc radius of the parasitic patch 42 and the radius of the main patch 41 is 0.02λ-0.06λ.

For example, the radius of the main patch 41 is 0.135λ, the length of the notch 43 is 0.03λ, the width of the notch 43 is 0.021λ, the inner arc radius of the parasitic patch 42 is 0.19λ, the outer arc radius of the parasitic patch 42 is 0.25λ, and the difference between the inner arc radius of the parasitic patch 42 and the radius of the main patch 41 is 0.055λ.

Figure 17:
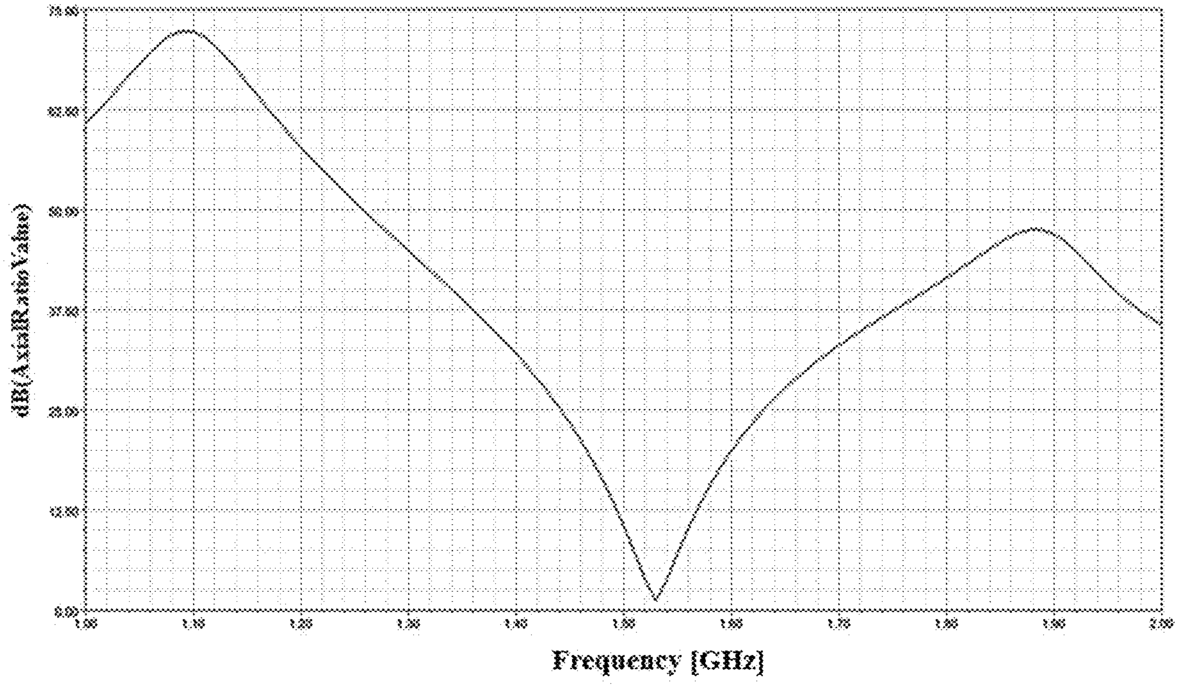
FIG. 17 is a schematic diagram showing the axial ratio simulation results for the embodiment shown in FIG. 16.

In some embodiments, in the embodiment shown in FIG. 16, the each parasitic patch 42 has an inner arc radius of 38 mm, an outer arc radius of 50 mm, and a central angle of 63°, the radius of the main patch 41 is 27 mm, and the notch 43 is a rectangle having a length of 6 mm and a width of 4.2 mm, and the difference between the inner arc radius of the parasitic patch 42 and the radius of the main patch 41 is 11 mm, the simulation result is shown in FIG. 17.

Therefore, in a case where the embodiment shown in FIG. 8 is taken as a reference, the circularly polarized antenna shown in FIG. 16 has an advantage that the operating frequency is about 1.5 GHz, which can meet the requirement of the B3 frequency band of the Beidou satellite navigation.

That is, the operating frequency of the circularly polarized antenna can be adjusted by adjusting the sizes and relative positions of the main patch and the parasitic patches, such that the circularly polarized antenna can be used in different scenarios.

Figure 18:
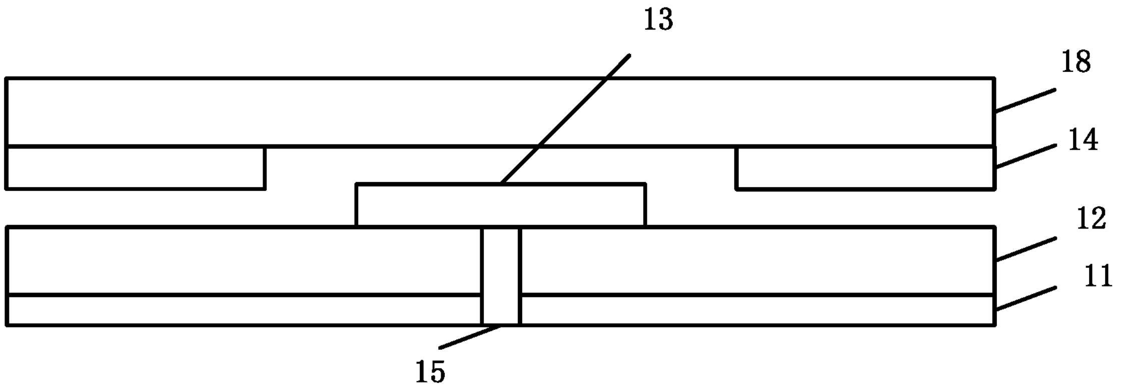
FIG. 18 a is schematic cross-sectional view illustrating a circularly polarized antenna according to still another embodiment of the present disclosure.

FIG. 18 is a schematic cross-sectional view of a circularly polarized antenna according to still another embodiment of the present disclosure.

FIG. 18 differs from FIG. 1 in that in the embodiment shown in FIG. 18, the circularly polarized antenna further comprises a rotatable second substrate 18.

It shall be noted that the material of the second substrate 18 may be the same as or different from the material of the first substrate 12.

The rotatable second substrate 18 is disposed on one side of the main patch 13 away from the first substrate 12, the plurality of the parasitic patches 14 are disposed on one side of the second substrate 18 close to the first substrate 12, and the rotational axis of the second substrate 18 passes through the center of the main patch 13 and is perpendicular to the plane where the main patch 13 is located.

It shall be noted that when the second substrate 18 rotates, the plurality of the parasitic patches 14 disposed on the second substrate 18 also rotate, such that the angle between the central symmetry axis of the parasitic patches 14 and the predetermined axis changes.

Figure 19:
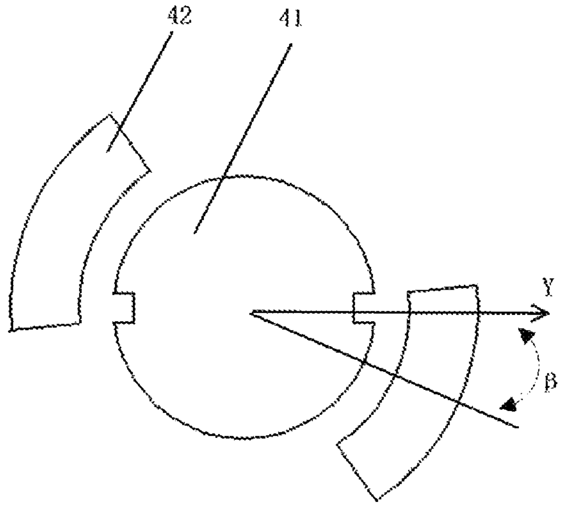
FIG. 19 is a top view of a circularly polarized antenna according to still another embodiment of the present disclosure.

For example, as shown in FIG. 19, in a case where the second substrate 18 rotates, two parasitic patches 14 disposed on the second substrate 18 also rotate, thereby causing the angle β between the central symmetry axis of the parasitic patch 14 and the Y-axis to change. The simulation result S11 of this example is shown in FIG. 20.

Figure 20:
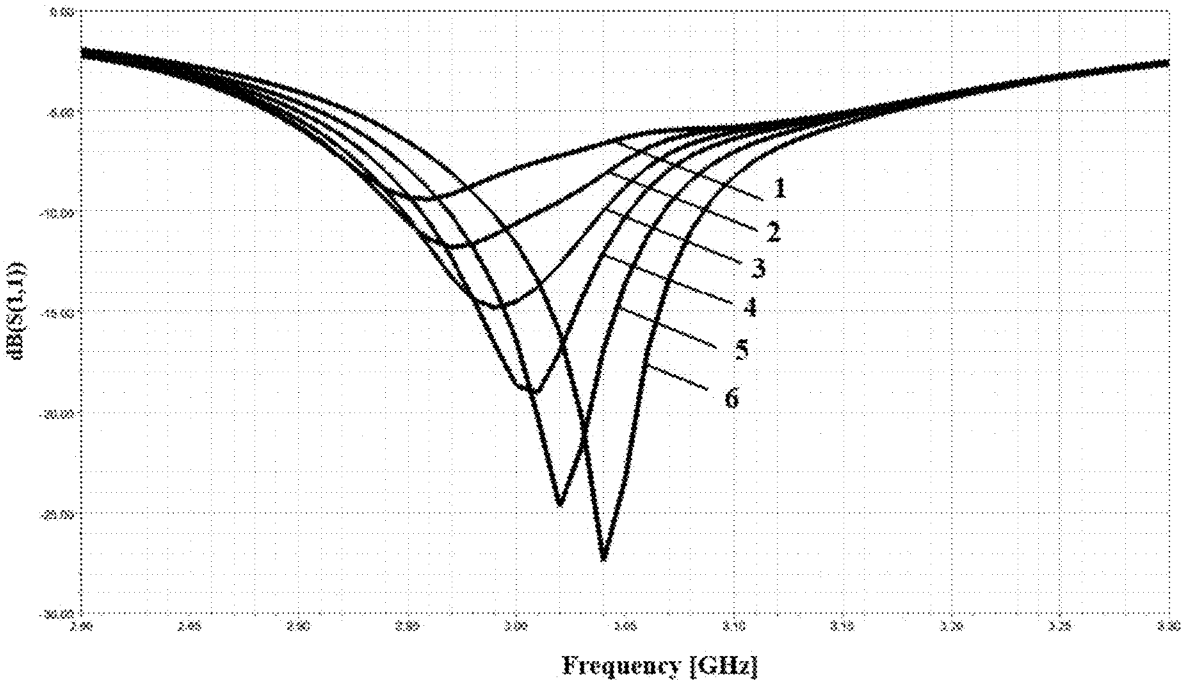
FIG. 20 is a schematic diagram illustrating the axial ratio simulation results of still another embodiment of the present disclosure.

As shown in FIG. 20, the simulation curve for the angle β of 10° is curve 1, the simulation curve for the angle β of 25° is curve 2, the simulation curve for the angle β of 40° is curve 3, the simulation curve for the angle β of 55° is curve 4, and the simulation curve for the angle β of 70° is curve 5.

As can be seen from FIG. 20, the resonance point frequency of the simulation result S11 increases with the increase of the angle β, thereby realizing frequency reconstruction.

Figure 21:
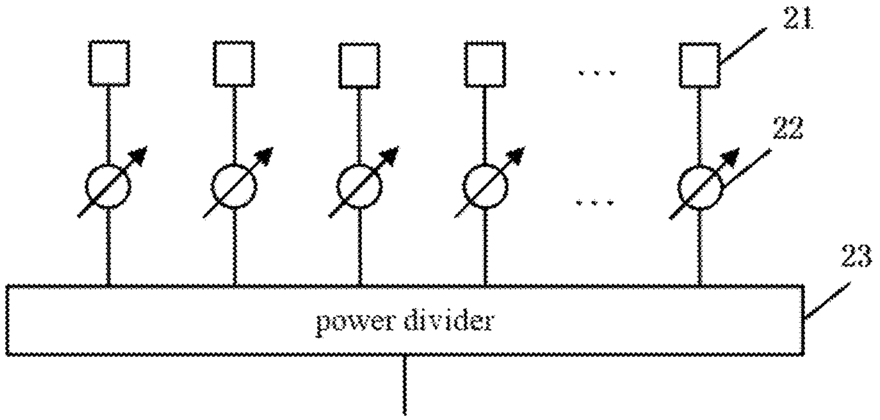
FIG. 21 is a schematic structural diagram of an array antenna according to one embodiment of the present disclosure.

FIG. 21 is a schematic structural diagram of an array antenna according to one embodiment of the present disclosure.

As shown in FIG. 21, the array antenna includes a plurality of circular polarized antennas 21, a plurality of phase shifters 22 and a power divider 23. At least one of the plurality of the circularly polarized antennas 21 is the circularly polarized antenna shown in any one of the embodiments of FIGS. 1-4, 6, 8, 10, 12, 14, 17 and 18.

The plurality of phase shifters 22 are in one-to-one correspondence with the plurality of circularly polarized antennas 21. Each phase shifter of the plurality of the phase shifters 22 is configured to perform a phase shift process on a signal transmitted or a signal received by the corresponding circularly polarized antenna 21.

The power divider 23 is configured to distribute power for each of the circularly polarized antennas 21.

In some embodiments, the plurality of circularly polarized antennas are configured as a linear array antenna or a planar array antenna.

Figure 22:
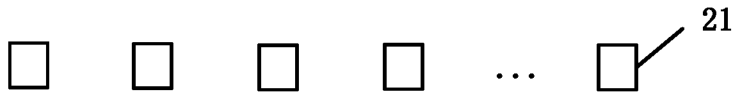
FIG. 22 is a schematic diagram of an array of an array antenna according to one embodiment of the present disclosure.

For example, as shown in FIG. 22, the plurality of the circularly polarized antennas are configured as a linear array.

Figure 23:
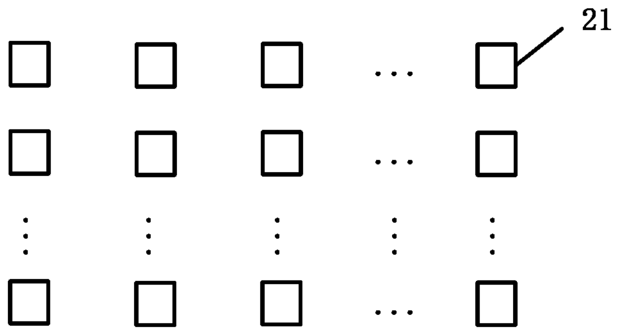
FIG. 23 is a schematic diagram of an array of an array antenna according another to embodiment of present disclosure.

For another example, as shown in FIG. 23, the plurality of the circularly polarized antennas are configured as a planar array. In a case where the array antenna comprises 48 circularly polarized antennas, the 48 circularly polarized antennas can be configured as a matrix array of 6×8.

So far, embodiments of the present disclosure have been described in detail. Some details well known in the art have not been described in order to avoid obscuring the concepts of the present disclosure. Those skilled in the art can now fully appreciate how to implement the technical solution disclosed herein, in view of the foregoing description.

Although some specific embodiments of the present disclosure have been described in detail by way of example, it should be understood by those skilled in the art that the above examples are for illustration only and are not intended to limit the scope of the present disclosure. It will be understood by those skilled in the art that the above embodiments can be amended or part of the technical features thereof can be replaced with equivalent ones without departing from the scope and spirit of the present disclosure. The scope of the present disclosure is defined by the appended claims.

What is claimed is:

1. A circularly polarized antenna, comprising:

a first substrate;

a ground plate disposed on a first side of the first substrate;

a main patch and a plurality of parasitic patches disposed on a second side of the first substrate opposite to the first side, wherein the plurality of the parasitic patches are disposed around the main patch and are in rotationally symmetrical distribution by taking the main patch as a center;

a feeding line disposed in the first substrate for electrically connecting the ground plate and the main patch; and a rotatable second substrate disposed on a side of the main patch away from the first substrate, wherein the plurality of the parasitic patches are disposed on a side of the second substrate close to the first substrate, and a rotational axis of the second substrate passes through a center of the main patch and is perpendicular to the plane where the main patch is located, thereby changing an angle between a central symmetry axis of each parasitic patch of the plurality of the parasitic patches and a predetermined axis in a case where the second substrate rotates.

2. The circularly polarized antenna according to claim 1, wherein the each parasitic patch of the plurality of the parasitic patches is in a shape of an annular sector by taking a center of the main patch as a circle center.

3. The circularly polarized antenna according to claim 2, wherein an axial ratio bandwidth of the circularly polarized antenna is in positive correlation with a radius length of a circular arc of the each parasitic patch away from the main patch.

4. The circularly polarized antenna according to claim 3, wherein the axial ratio bandwidth of the circularly polarized antenna is in positive correlation with a central angle of the each parasitic patch.

5. The circularly polarized antenna according to claim 4, wherein the axial ratio bandwidth of the circularly polarized antenna is in positive correlation with a distance between the main patch and the each parasitic patch, wherein the distance is a difference between a radius length of a circular arc of the each parasitic patch close to the main patch and a radius length of the main patch.

6. The circularly polarized antenna according to claim 2, wherein an operating frequency of the circularly polarized antenna is associated with at least one of a radius length of the main patch, a radius length of a circular arc of the each parasitic patch close to the main patch, or a radius length of a circular arc of the each parasitic patch away from the main patch.

7. The circularly polarized antenna according to claim 2, wherein a number of the plurality of the parasitic patches is 2.

8. The circularly polarized antenna according to claim 1, wherein each parasitic patch of the plurality of the parasitic patches is in a shape of a rectangular.

9. The circularly polarized antenna according to claim 1, wherein a surface of the main patch close to the first substrate and a surface of each parasitic patch of the plurality of the parasitic patches close to the first substrate are in a same plane.

10. The circularly polarized antenna according to claim 1, wherein a surface of the main patch close to the first substrate and a surface of each parasitic patch of the plurality of the parasitic patches close to the first substrate are in different planes.

11. The circularly polarized antenna according to claim 10, wherein the surface of the each parasitic patch of the plurality of the parasitic patches close to the first substrate is in a same plane.

12. The circularly polarized antenna according to claim 11, wherein a surface of at least one parasitic patch of the plurality of the parasitic patches close to the first substrate and surfaces of the other parasitic patches of the plurality of the parasitic patches are in different planes.

13. The circularly polarized antenna according to claim 1, wherein a plurality of notches are disposed at an edge of the main patch, and the plurality of the notches are symmetrically distributed by taking the main patch as a center.

14. The circularly polarized antenna according to claim 13, wherein each notch of the plurality of the notches is in a shape of a polygon or a circular arc.

15. The circularly polarized antenna according to claim 14, wherein the polygon comprises a square or a rectangle.

16. The circularly polarized antenna according to claim 13, wherein the main patch is in a shape of a polygon, a circle, an ellipse, or an annular.

17. The circularly polarized antenna according to claim 16, wherein the polygon in a shape of a square, a rectangle, a triangle, or a pentagon.

18. An array antenna, comprising:

a plurality of circularly polarized antennas, wherein each circularly polarized antenna of the plurality of the circularly polarized antennas comprises:
- a first substrate;
- a ground plate disposed on a first side of the first substrate;
- a main patch and a plurality of parasitic patches disposed on a second side of the first substrate opposite to the first side, wherein the plurality of the parasitic patches are disposed around the main patch and are in rotationally symmetrical distribution by taking the main patch as a center;
- a feeding line disposed in the first substrate for electrically connecting the ground plate and the main patch; and
- a rotatable second substrate disposed on a side of the main patch away from the first substrate, wherein the plurality of the parasitic patches are disposed on a side of the second substrate close to the first substrate, and a rotational axis of the second substrate passes through a center of the main patch and is perpendicular to the plane where the main patch is located, thereby changing an angle between a central symmetry axis of each parasitic patch of the plurality of the parasitic patches and a predetermined axis in a case where the second substrate rotates;

a plurality of phase shifters, wherein the plurality of the phase shifters are in one-to-one correspondence with the plurality of the circularly polarized antennas, and each phase shifter of the plurality of the phase shifters is used for performing phase shift processing on a signal transmitted by a corresponding circularly polarized antenna or a signal received by the corresponding circularly polarized antenna; and a power divider configured to distribute power for each circularly polarized antenna of the circularly polarized antennas.

19. The array antenna according to claim 18, wherein the plurality of circularly polarized antennas are configured as a linear array antenna or a planar array antenna.

* * * * *